United States Patent
Hirose et al.

(10) Patent No.: US 8,314,029 B2
(45) Date of Patent: Nov. 20, 2012

(54) PROCESS FOR PRODUCING POLYURETHANE FOAM

(75) Inventors: Junji Hirose, Osaka (JP); Takeshi Fukuda, Osaka (JP); Masato Doura, Osaka (JP); Akinori Sato, Osaka (JP); Kenji Nakamura, Osaka (JP)

(73) Assignee: Toyo Tire & Rubber Co., Ltd., Osaka-shi (JP)

( * ) Notice: Subject to any disclaimer, the term of this patent is extended or adjusted under 35 U.S.C. 154(b) by 475 days.

(21) Appl. No.: 12/593,174

(22) PCT Filed: Feb. 29, 2008

(86) PCT No.: PCT/JP2008/053602
§ 371 (c)(1),
(2), (4) Date: Sep. 25, 2009

(87) PCT Pub. No.: WO2008/126497
PCT Pub. Date: Oct. 23, 2008

(65) Prior Publication Data
US 2010/0120249 A1    May 13, 2010

(30) Foreign Application Priority Data

Mar. 27, 2007  (JP) .............................. 2007-081403

(51) Int. Cl.
*H01L 21/302* (2006.01)
(52) U.S. Cl. ............ 438/692; 438/691; 216/33; 451/533
(58) Field of Classification Search .................. 438/691, 438/692, 693; 451/82, 106, 134, 526, 539; 216/33
See application file for complete search history.

(56) References Cited

U.S. PATENT DOCUMENTS

| 5,658,508 A | 8/1997 | Yukawa et al. |
| 2002/0069591 A1 | 6/2002 | Yancey |
| 2004/0054023 A1* | 3/2004 | Kaneda et al. ................ 521/170 |
| 2005/0248102 A1 | 11/2005 | Sato |
| 2006/0022368 A1* | 2/2006 | Lee et al. ........................ 264/51 |

(Continued)

FOREIGN PATENT DOCUMENTS

BE           847834         4/1977

(Continued)

OTHER PUBLICATIONS

International Search Report mailed Jun. 10, 2008, directed to counterpart International Patent Application No. PCT/JP2008/053602; 2 pages.

(Continued)

*Primary Examiner* — Lan Vinh
(74) *Attorney, Agent, or Firm* — Morrison & Foerster LLP

(57) ABSTRACT

A method for manufacturing a polishing pad containing substantially spherical cells and having high thickness accuracy includes preparing a cell-dispersed urethane composition by a mechanical foaming method; continuously discharging the cell-dispersed urethane composition from a single discharge port to a substantially central portion in the width direction of a face material A, while feeding the face material A; laminating a face material B on the cell-dispersed urethane composition; then uniformly adjusting the thickness of the cell-dispersed urethane composition by thickness adjusting means; curing the cell-dispersed urethane composition with the thickness adjusted in the preceding step without applying any additional load to the composition so that a polishing sheet including a polyurethane foam is formed; and cutting the polishing sheet.

5 Claims, 2 Drawing Sheets

U.S. PATENT DOCUMENTS

| | | |
|---|---|---|
| 2006/0025493 A1 | 2/2006 | Simpson et al. |
| 2006/0202384 A1 | 9/2006 | Duong et al. |
| 2007/0141312 A1* | 6/2007 | James .................... 428/212 |
| 2008/0305720 A1 | 12/2008 | Hirose et al. |

FOREIGN PATENT DOCUMENTS

| | | |
|---|---|---|
| JP | 52-53969 | 4/1977 |
| JP | 52-71562 | 6/1977 |
| JP | 7-329086 | 12/1995 |
| JP | 2003-516872 | 5/2003 |
| JP | 2004-169038 | 6/2004 |
| JP | 2005-227392 | 8/2005 |
| JP | 2006-253691 A | 9/2006 |
| JP | 2007-61929 A | 3/2007 |

OTHER PUBLICATIONS

Chinese Office Action mailed Dec. 21, 2010, directed to counterpart Chinese Application No. 200880005623.0; 8 pages.

Notification of Reasons for Refusal mailed Jan. 17, 2012, directed to Japanese Application No. 2007-081403; 4 pages.

* cited by examiner

PROCESS FOR PRODUCING POLYURETHANE FOAM

REFERENCE TO RELATED APPLICATIONS

This application is a national stage application under 35 USC 371 of International Application No. PCT/JP2008/053602, filed Feb. 29, 2008, which claims the priority of Japanese Patent Application No. 2007-081403, filed Mar. 27, 2007, the contents of both of which prior applications are incorporated herein by reference.

FIELD OF THE INVENTION

The present invention relates to a method for production of a polishing pad by which the planarizing processing of optical materials such as lenses, reflecting mirrors and the like, silicon wafers, glass substrates for hard disks, aluminum substrates, and materials requiring a high degree of surface planarity such as those in general metal polishing processing can be carried out stably with high polishing efficiency. The polishing pad of the present invention is used particularly preferably in a process of planarizing a silicon wafer, and a device having an oxide layer, a metal layer or the like formed on a silicon wafer, before lamination and formation of the oxide layer, the metal layer or the like.

BACKGROUND OF THE INVENTION

Production of a semiconductor device involves a step of forming an electroconductive film on the surface of a wafer to form a wiring layer by photolithography, etching etc., a step of forming an interlaminar insulating film on the wiring layer, etc., and an uneven surface made of an electroconductive material such as metal and an insulating material is generated on the surface of a wafer by these steps. In recent years, processing for fine wiring and multilayer wiring is advancing for the purpose of higher integration of semiconductor integrated circuits, and accordingly techniques of planarizing an uneven surface of a wafer have become important.

As the method of planarizing an uneven surface of a wafer, a CMP method is generally used. CMP is a technique wherein while the surface of a wafer to be polished is pressed against a polishing surface of a polishing pad, the surface of the wafer is polished with an abrasive in the form of slurry having abrasive grains dispersed therein (hereinafter, referred to as slurry). As shown in FIG. 1, a polishing apparatus used generally in CMP is provided for example with a polishing platen 2 for supporting a polishing pad 1, a supporting stand (polishing head) 5 for supporting a polished material (wafer) 4, a backing material for uniformly pressurizing a wafer, and a mechanism of feeding an abrasive. The polishing pad 1 is fitted with the polishing platen 2 for example via a double-sided tape. The polishing platen 2 and the supporting stand 5 are provided with rotating shafts 6 and 7 respectively and are arranged such that the polishing pad 1 and the polished material 4, both of which are supported by them, are opposed to each other. The supporting stand 5 is provided with a pressurizing mechanism for pushing the polished material 4 against the polishing pad 1.

Conventionally, such polishing pads are produced by batch methods such as (1) a method including pouring a resin material into a mold to form a resin block and slicing the resin block with a slicer; and (2) a method including pouring a resin material into a mold and pressing the resin material into a thin sheet form.

A method for continuously producing a polyurethane-polyurea polishing sheet material is proposed in order to prevent variations in hardness, cell size or the like attributed to batch production method (Patent Literature 1). Specifically, the proposed method includes mixing a raw material for polyurethane, a fine powder having a diameter of 300 μm or less, and an organic foaming agent, discharging the mixture to the space between a pair of caterpillar belts to cast it, then carrying out the polymerization of the mixture with heating means, and separating the generated sheet-shaped product from the surface belt so that a polishing sheet material is obtained. When a pair of caterpillar belts is used, however, there is a problem in which the resulting polyurethane foam tends to have flat cells and therefore has low polishing performance.

There is also proposed a method for continuously producing an elastic sheet that includes supplying a raw material for a polyurethane foam onto a base film being continuously supplied and subjecting the raw material to a reaction and curing, while the thickness of the raw material for the polyurethane foam is controlled using two rollers and a surface protection film (Patent Literature 2). However, this method also has the same problem as described above.

There is also disclosed a method for continuously producing a polishing pad having an undercoat layer and a polishing layer, which is for the purpose of reducing the difference between polishing pads produced in different batches (Patent Literature 3). In the method of Patent Literature 3, however, it is difficult to adjust the thickness of a fluid-phase polymer composition supplied onto the undercoat layer, so that a polishing layer with high thickness accuracy cannot be produced.

Patent Literature 1: JP-A 2004-169038
Patent Literature 2: JP-A 2005-227392
Patent Literature 3: JP-A 2003-516872

SUMMARY OF THE INVENTION

An object of the invention is to provide a method for manufacturing a polishing pad containing substantially spherical cells and having high thickness accuracy.

As a result of investigations to solve the above problems, the inventors have completed the invention based on the finding that the object can be achieved by the method for manufacturing a polishing pad described below.

Specifically, the invention is directed to a method for manufacturing a polishing pad, comprising the steps of: preparing a cell-dispersed urethane composition by a mechanical foaming method; continuously discharging the cell-dispersed urethane composition from a single discharge port to a substantially central portion in the width direction of a face material A, while feeding the face material A; laminating a face material B on the cell-dispersed urethane composition; then uniformly adjusting the thickness of the cell-dispersed urethane composition by thickness adjusting means; curing the cell-dispersed urethane composition with the thickness adjusted in the preceding step without applying any additional load to the composition so that a polishing sheet including a polyurethane foam is formed; and cutting the polishing sheet.

The above manufacturing method allows continuous production of a polishing sheet containing substantially spherical cells and having high thickness accuracy. Specifically, the cell-dispersed urethane composition is discharged from a single discharge port to a substantially central portion in the width direction of the face material A, so that air trapping can be suppressed and that void formation can be effectively prevented.

The thickness of the cell-dispersed urethane composition is adjusted after the face material B is placed on the cell-dispersed urethane composition, so that the cell-dispersed composition can be prevented from adhering to a thickness adjusting device such as a blade and from forming a cured product deposited thereon. As a result, the formation of irregularities on the surface of the cell-dispersed urethane composition after the thickness adjustment can be prevented, which would be caused by the cured product. If the thickness is adjusted without lamination of the face material B as in conventional production methods, the cell-dispersed urethane composition will adhere to a thickness adjusting device such as a blade and be cured to form a cured product deposited thereon. The cured product may intrude into the cell-dispersed urethane composition after the thickness adjustment or form irregularities on the surface of the cell-dispersed urethane composition, so that a polishing sheet with high thickness accuracy cannot be produced.

After the thickness of the cell-dispersed urethane composition is uniformly adjusted by thickness adjusting means, the cell-dispersed urethane composition is cured without the application of any additional load, so that a polishing sheet containing substantially spherical cells and offering high polishing performance (particularly high polishing rate) can be produced. In the manufacturing method of the invention, the thickness of the cell-dispersed urethane composition should be adjusted in a short time using a thickness adjusting device such as a blade, and the cell-dispersed urethane composition needs to be cured without the application of any load in the subsequent curing step. If, as in conventional production methods, a load is applied from a double conveyor system or the like to the cell-dispersed urethane composition until the composition is cured, flat cells can be easily formed in the polyurethane foam due to pressure, so that the polishing performance may be undesirably reduced.

In the manufacturing method of the invention, the face material A is preferably fed at a rate of 0.5 to 2.5 m/minute onto an immobile plate. The face material A may be allowed to slide on the immobile plate when moved, so that a polishing sheet with high thickness accuracy can be produced. The use of a belt conveyor may have an adverse effect on the thickness accuracy of the cell-dispersed urethane composition, because vibrations may be transmitted from the moving belt conveyor to the face material A or because it may be difficult to keep the belt conveyor surface smooth. If the moving speed of the face material A is less than 0.5 m/minute, the curing reaction of the cell-dispersed urethane composition may proceed to increase the viscosity during the adjustment of the thickness of the cell-dispersed urethane composition, so that it may be difficult to uniformly adjust the thickness. On the other hand, if the moving speed of the face material A is more than 2.5 m/minute, the time for which the cell-dispersed urethane composition can be spread over the face material A may be insufficient so that it may be difficult to prepare a polishing sheet with the desired width.

In the manufacturing method of the invention, the cell-dispersed urethane composition is preferably discharged at a rate of 0.25 to 5 L/min, and the cell-dispersed urethane composition passing through the discharge port preferably has a discharge velocity of 2 to 20 m/min. If the discharge rate is less than 0.25 L/min, the mixing ratio between the urethane composition and a non-reactive gas may be difficult to adjust, so that it may be difficult to produce a polishing sheet with the desired specific gravity, thickness and width. On the other hand, if the discharge rate is more than 5 L/min, it may be difficult to prepare a polishing sheet with the desired cell size. If the discharge velocity is less than 2 m/min, masses of a cured product of the cell-dispersed urethane composition may easily be formed at the discharge port, which is not preferred. On the other hand, if the discharge velocity is more than 20 m/min, the cell-dispersed urethane composition may easily be splattered on the face material A, so that air trapping may easily occur to form voids, which is not preferred.

In the manufacturing method of the invention, the cell-dispersed urethane composition is preferably discharged at a temperature of 40 to 70° C., and the temperature of the face materials A and B is preferably controlled to be in the range from −20 to +20° C. based on the temperature at which the cell-dispersed urethane composition is discharged. The cell-dispersed urethane composition having a temperature in the above rage during the discharge can have an appropriate degree of fluidity so that a polishing sheet with the desired width and thickness can be easily prepared. When the temperatures of the face materials A and B are controlled to be in the above range, dimensional change of the face material can be suppressed during the discharge of the cell-dispersed urethane composition, so that a polishing sheet with high thickness accuracy can be prepared.

DETAILED DESCRIPTION OF THE INVENTION

Figure 1:
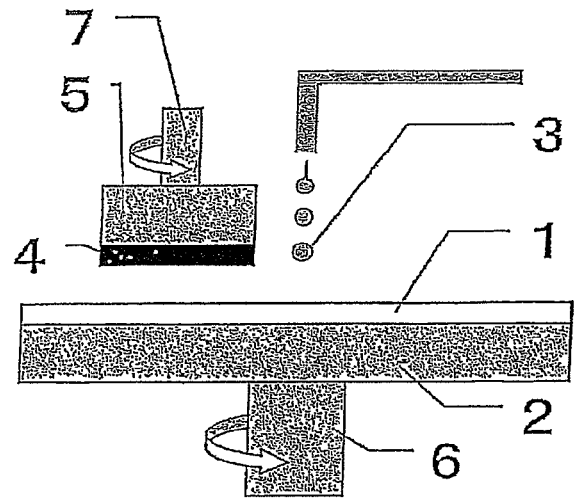
FIG. 1 is a schematic diagram showing one example of a polishing apparatus for use in CMP polishing.

The cell-dispersed urethane composition of the present invention may only be prepared by a mechanical foaming method (including a mechanical frothing method), and the other features of the composition are not particularly limited. For example, the cell-dispersed urethane composition may be prepared by the method described below.

(1) The first component wherein a silicon-based surfactant is added to an isocyanate-terminated prepolymer produced by an isocyanate component with a high-molecular-weight polyol or the like is mechanically stirred in the presence of an unreactive gas, to disperse the unreactive gas as fine cells thereby forming a cell dispersion. Then, the second component containing active hydrogen-containing compounds such as low-molecular-weight polyols and low-molecular-weight polyamines are added to, and mixed with, the cell dispersion to prepare a cell-dispersed urethane composition. If necessary, a catalyst and a filler such as carbon black may be added to the second component.

(2) A silicon-based surfactant is added to the first component containing an isocyanate component (or an isocyanate-terminated prepolymer) and/or the second component containing active hydrogen-containing compounds, and the component(s) to which the silicon-based surfactant is added is mechanically stirred in the presence of an unreactive gas, to disperse the unreactive gas as fine cells thereby forming a cell dispersion. Then, the remaining component is added to, and mixed with, the cell dispersion to prepare a cell-dispersed urethane composition.

(3) A silicon-based surfactant is added to at least either of the first component containing an isocyanate component (or an, isocyanate-terminated prepolymer) or the second component containing active hydrogen-containing compounds, and the first and second components are mechanically stirred in the presence of an unreactive gas, to disperse the unreactive gas as fine cells thereby preparing a cell-dispersed urethane composition.

Alternatively, the cell-dispersed urethane composition may be prepared by a mechanical frothing method. The mechanical frothing method is a method wherein starting components are introduced into a mixing chamber, while an unreactive gas is mixed therein, and the mixture is mixed under stirring with a mixer such as an Oaks mixer thereby dispersing the unreactive gas in a fine-cell state in the starting mixture. The mechanical frothing method is a preferable method because a density of the polyurethane foam can be easily adjusted by regulating the amount of an unreactive gas mixed therein.

As the isocyanate component, a compound known in the field of polyurethane can be used without particular limitation. The isocyanate component includes, for example, aromatic diisocyanates such as 2,4-toluene diisocyanate, 2,6-toluene diisocyanate, 2,2'-diphenyl methane diisocyanate, 2,4'-diphenyl methane diisocyanate, 4,4'-diphenyl methane diisocyanate, polymeric MDI, carbodiimide-modified MDI (for example, Millionate MTL made by Nippon Polyurethane Industry Co., Ltd.), 1,5-naphthalene diisocyanate, p-phenylene diisocyanate, m-phenylene diisocyanate, p-xylylene diisocyanate and m-xylylene diisocyanate, aliphatic diisocyanates such as ethylene diisocyanate, 2,2,4-trimethyl hexamethylene diisocyanate and 1,6-hexamethylene diisocyanate, and cycloaliphatic diisocyanates such as 1,4-cyclohexane diisocyanate, 4,4'-dicyclohexyl methane diisocyanate, isophorone diisocyanate and norbornane diisocyanate. These may be used alone or as a mixture of two or more thereof.

As the isocyanate component, it is possible to use not only the above-described diisocyanate compounds but also multifunctional (trifunctional or more) polyisocyanates. As the multifunctional isocyanate compounds, a series of diisocyanate adduct compounds are commercially available as Desmodul-N (Bayer) and Duranate™ (Asahi Chemical Industry Co., Ltd.).

The high-molecular-weight polyol includes, for example, polyether polyols represented by polytetramethylene ether glycol, polyester polyols represented by polybutylene adipate, polyester polycarbonate polyols exemplified by reaction products of polyester glycols such as polycaprolactone polyol and polycaprolactone with alkylene carbonate, polyester polycarbonate polyols obtained by reacting ethylene carbonate with a multivalent alcohol and reacting the resulting reaction mixture with an organic dicarboxylic acid, and polycarbonate polyols obtained by ester exchange reaction of a polyhydroxyl compound with aryl carbonate. These may be used singly or as a mixture of two or more thereof.

Examples of the low-molecular-weight polyol that can be used together with a high-molecular-weight polyol described above include: ethylene glycol, 1,2-propylene glycol, 1,3-propylene glycol, 1,2-butanediol, 1,3-butanediol, 1,4-butanediol, 2,3-butanediol, 1,6-hexanediol, neopentyl glycol, 1,4-cyclohexanedimethanol, 3-methyl-1,5-pentanediol, diethylene glycol, triethyleneglycol, 1,4-bis(2-hydroxyethoxy)benzene, trimethylolpropane, glycerin, 1,2,6-hexanetriol, pentaerythritol, tetramethylolcyclohexane, methyl glucoside, sorbitol, mannitol, dulcitol, sucrose, 2,2,6,6-tetrakis(hydroxymethyl)cyclohexanol, diethanolamine, N-methyldiethanolamine, triethanolamine and the like. Other examples that can be used together with the high-molecular-weight polyol also include: low-molecular-weight polyamine such as ethylenediamine, tolylenediamine, diphenylmethanediamine, diethylenetriamine and the like. Still other examples that can be used together with the high-molecular-weight polyol also include: alcoholamines such as monoethanolamine, 2-(2-aminoethylamino)ethanol, monopropanolamine and the like. These low-molecular-weight polyols, high-molecular-weight polyamines etc. may be used alone or as a mixture of two or more thereof.

In the case where a polyurethane is produced by means of a prepolymer method, a chain extender is used in curing of a prepolymer. A chain extender is an organic compound having at least two active hydrogen groups and examples of the active hydrogen group include: a hydroxyl group, a primary or secondary amino group, a thiol group (SH) and the like. Concrete examples of the chain extender include: polyamines such as 4,4'-methylenebis(o-chloroaniline) (MOCA), 2,6-dichloro-p-phenylenediamine, 4,4'-methylenebis(2,3-dichloroaniline), 3,5-bis(methylthio)-2,4-toluenediamine, 3,5-bis(methylthio)-2,6-toluenediamine, 3,5-diethyltoluene-2,4-diamine, 3,5-diethyltoluene-2,6-diamine, trimethylene glycol-di-p-aminobenzoate, polytetramethylene oxide-di-p-aminobenzoate, 4,4'-diamino-3,3',5,5'-tetraethyldiphenylmethane, 4,4'-diamino-3,3'-diisopropyl-5.5'-dimethyldiphenylmethane, 4,4'-diamino-3,3',5,5'-tetraisopropyldiphenylmethane, 1,2-bis(2-aminophenylthio)ethane, 4,4'-diamino-3,3'-diethyl-5.5'-dimethyldiphenylmethane, N,N'-di-sec-butyl-4,4'-diaminophenylmethane, 3,3'-diethyl-4,4'-diaminodiphenylmethane, m-xylylenediamine, N,N'-di-sec-butyl-p-phenylenediamine, m-phenylenediamine and p-xylylenediamine; low-moleculer-weight polyol component; and a low-molecular-weight polyamine component. The chain extenders described above may be used either alone or in mixture of two kinds or more.

A ratio between an isocyanate component, a polyol and a chain extender in the invention can be altered in various ways according to molecular weights thereof, desired physical properties of polyurethane foam and the like. In order to obtain polyurethane foam with desired polishing characteristics, a ratio of the number of isocyanate groups in an isocyanate component relative to a total number of active hydrogen groups (hydroxyl groups+amino groups) in a polyol and a chain extender is preferably in the range of from 0.80 to 1.20 and more preferably in the range of from 0.99 to 1.15. When the number of isocyanate groups is outside the aforementioned range, there is a tendency that curing deficiency is caused, required specific gravity and hardness are not obtained.

The isocyanate-terminated prepolymer is preferably a prepolymer having a molecular weight of about 800 to 5000 because of its excellent workability, physical properties etc. When the prepolymer is solid at an ordinary temperature, the prepolymer is melted by preheating at a suitable temperature prior to use.

The silicone surfactant typically includes a surfactant containing a polyalkylsiloxane-polyether copolymer. Preferred examples of such a silicone surfactant include SH-192 and L-5340 (manufactured by Dow Corning Toray Silicone Co., Ltd) as preferred compounds. The content of the silicone surfactant in the polyurethane foam is preferably from 0.05 to 5% by weight. If the content of the silicone surfactant is less than 0.05% by weight, fine-cell foams may be less likely to be produced. If the content is more than 5% by weight, high-hardness polyurethane foams may tend to be difficult to produce, because of the plasticizing effect, or the problem of bleeding or the like may tend to easily occur.

If necessary, any other additive may be added, such as a stabilizer including an antioxidant, a lubricant, a pigment, a filler, or an antistatic agent. A known catalyst capable of accelerating the polyurethane reaction, such as a tertiary amine catalyst, may also be used. The type and content of the catalyst may be appropriately selected taking into account the time for which the cell-dispersed urethane composition can flow after it is discharged onto the face material A.

The unreactive gas used for forming fine cells is preferably not combustible, and is specifically nitrogen, oxygen, a carbon dioxide gas, a rare gas such as helium and argon, and a mixed gas thereof, and the air dried to remove water is most preferable in respect of cost.

As a stirring device for dispersing an unreactive gas in a fine-cell state, any known stirring deices can be used without particular limitation, and specific examples include a homogenizer, a dissolver, a twin-screw planetary mixer, a mechanical froth foaming machine etc. The shape of a stirring blade of the stirring device is not particularly limited, and a whipper-type stirring blade is preferably used to form fine cells. For obtaining the intended polyurethane foam, the number of revolutions of the stirring blade is preferably 500 to 2000 rpm, more preferably 800 to 1500 rpm. The stirring time is suitably regulated depending on the intended density.

In a preferable mode, different stirring devices are used for preparing a cell dispersion in the foaming process and for stirring the first and the second components to mix them, respectively. Stirring in the mixing step may not be stirring for forming cells, and a stirring device not generating large cells is preferably used in the mixing step. Such a stirring device is preferably a planetary mixer. The same stirring device may be used in the foaming step of preparing a cell dispersion and in the mixing step of mixing the respective components, and stirring conditions such as a revolution rate of the stirring blade are preferably regulated according to necessary.

Figure 2:
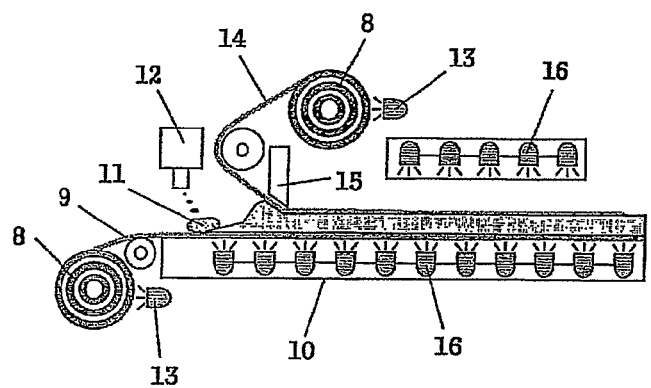
FIG. 2 is a schematic diagram showing the process for manufacturing a polishing sheet according to the invention.

The method for manufacturing a polishing pad of the invention is specifically described below. FIG. 2 is a schematic diagram showing the process for manufacturing a polishing sheet according to the invention.

A face material A 9 is fed from a supply roll 8 and moved on an immobile plate 10. A cell-dispersed urethane composition 11 is continuously discharged from a discharge port of a mixing head 12 to a substantially central portion in the width direction of the face material A. A belt conveyor may be used in place of the immobile plate. In order to increase the accuracy of the thickness of the cell-dispersed urethane composition, however, an immobile plate is preferably used.

Examples of the face material A include, but are not limited to, materials not penetrable to the cell-dispersed urethane composition, such as paper, a resin film and a metal film. In particular, a resin film is preferred in view of heat resistance, flexibility, and prevention of metal impurity contamination.

Examples of the resin that may be used to form the face material A include polyethylene terephthalate, polyester, polyethylene, polypropylene, polystyrene, polyimide, polyvinyl alcohol, polyvinyl chloride, fluororesin such as polyfluoroethylene, nylon, and, cellulose. Among them, polyethylene terephthalate having low thermal expansion is preferably used.

The thickness of the face material A is preferably, but not limited to, from about 20 to about 200 μm in view of strength, winding or the like. The width of the face material A is preferably, but not limited to, from about 60 to about 250 cm in view of the required size of the polishing sheet.

The surface of the face material A is preferably subjected to release treatment, so that the face material A can be easily released after the preparation of the polishing sheet.

The face material A is preferably fed onto the immobile plate at a rate of 0.5 to 2.5 m/min, and more preferably 1 to 1.5 m/min.

In the invention, the cell-dispersed urethane composition needs to be discharged from a single discharge port to a substantially central portion in the width direction of the face material A. If the composition is discharged from two or more discharge ports or discharged while the discharge port is moved in the width direction, air can be easily trapped so that voids can be easily formed, which is not preferred. As used herein, the term "substantially central portion" refers to a portion in the range from the center to the position 10 cm left or right of the center. When discharged to a position outside the substantially central portion, the cell-dispersed urethane composition is less likely to be evenly spread to the left and right, which is not preferred.

The cell-discharged urethane composition is preferably discharged at a rate of 0.25 to 5 L/min, and more preferably 1 to 2 L/min. The cell-dispersed urethane composition passing through the discharge port preferably has a discharge velocity of 2 to 20 m/min, and more preferably 5 to 15 m/min. The distance from the face material A to the discharge port is generally, but not limited to, from about 0.5 to about 2 cm.

The cell-dispersed urethane composition is preferably discharged at a temperature of 40 to 70° C., and more preferably 50 to 65° C. The temperature of the face material A is preferably controlled by a heater 13 to be in the range from −20 to +20° C., and more preferably from −10 to +10° C., based on the temperature at which the cell-dispersed urethane composition is discharged.

A face material B 14 is then laminated on the cell-dispersed urethane composition 11, and the thickness of the cell-dispersed urethane composition 11 is uniformly adjusted by thickness adjusting means 15.

Examples of the face material B to be used include, but are not limited to, those listed above for the face material A. The temperature of the face material B is preferably controlled by the heater 13 to be in the range from −20 to +20° C., and more preferably from −10 to +10° C., based on the temperature at which the cell-dispersed urethane composition is discharged. The face material B needs to be fed at the same rate as that of the face material A.

Examples of the thickness adjusting means include a blade 15 such as a doctor blade and a roll such as a nip roll and a coater roll. The thickness should be adjusted in a short period of time before the cell-dispersed urethane composition loses fluidity (generally within 5 minutes after the discharge), and the thickness is generally adjusted in 10 seconds or less, preferably 5 seconds or less, and more preferably 2 seconds or less. If the thickness adjusting time is too long, curing may proceed while the shape of cells in the polyurethane foam remains flat, so that the resulting polishing performance may be undesirably low.

The cell-dispersed urethane composition with the thickness adjusted in the preceding step is then cured without the application of any additional load to the composition so that a polishing sheet including a polyurethane foam is formed. In order to form substantially spherical cells in the polyurethane foam, curing needs to be performed without the application of any additional load once the thickness is adjusted. For example, the cell-dispersed urethane composition may be cured by allowing it to pass through the interior of a heating oven 16 placed at the immobile plate. A heating temperature may be from about 40 to about 100° C., and the heating time may be from about 5 to about 60 minutes. The heat source may be placed only above or below the immobile plate or both above and below the immobile plate. In order to thermally expand the face materials A and B at the same level, the heat source is preferably placed both above and below the immobile plate, so that a polishing sheet with high thickness accuracy can be produced.

The polyurethane foam preferably has an average cell size of 30 to 200 µm, and more preferably 30 to 100 µm. If it is outside the range, the polishing rate or the planarity (flatness) of a material to be polished (wafer) after polishing may tend to be reduced.

For example, the resulting polishing sheet is subjected to primary cutting with a cutting machine so that a piece having a shape slightly larger than the desired shape (such as a circle, a square, a rectangle, or a roll of a piece with a length of several meters) is obtained. The cut piece is then subjected to post-curing, the step of releasing the face materials A and B, and any other step, so that a polishing layer is prepared. The post-curing has the effect of improving the physical properties of the polyurethane foam. The post-curing may be performed either before or after the face materials A and B are released. In order to prevent the deformation of a polishing layer, the post-curing is preferably performed after the face materials A and B are released, because the face materials generally differ from the polishing layer in thermal shrinkage. After the post-curing, the polishing layer is subjected to secondary cutting so that a piece having the desired shape is obtained. When a circular piece is formed by cutting, its diameter may be from about 50 to about 200 cm, and preferably from 50 to 100 cm. When a square piece is formed by cutting, its side length may be from about 50 to about 200 cm, and preferably from 50 to 100 cm. When a rectangular piece is formed by cutting, its width may be from about 50 to about 200 cm, and preferably from 50 to 100 cm, and its length may be about 1.1 to 2 times the width. When a roll of a piece is formed by cutting, its length is generally from about 5 to about 10 m, which may be appropriately adjusted depending on the polishing apparatus to be used.

The thickness of the polishing layer is generally, but not limited to, from about 0.8 to about 4 mm, and preferably from 1.2 to 2.5 mm.

The polishing layer preferably has a specific gravity of 0.2 to 1.0. If the specific gravity is less than 0.2, the surface of the polishing layer may have reduced strength so that the planarity (flatness) of the material to be polished may tend to be low. If the specific gravity is more than 1.0, the polishing rate may tend to be low, although the number of fine-cells in the surface of the polishing layer may be small so that good planarizing performance may be obtained.

The hardness of the polishing layer is preferably 65 degrees or less as measured with an Asker D hardness meter. If the D hardness is more than 65 degrees, the uniformity (evenness) of the material to be polished may tend to be low after polishing, although the planarity may be good.

Polishing layers produced by conventional methods are generally subjected to buffing with a polishing material so that variations in the thickness can be adjusted. In contrast, the polishing layer produced by the method described above has high thickness accuracy and generally has a thickness variation of 100 µm or less, possibly 50 µm or less, even when it is subjected to no buffing. If the thickness variation exceeds 100 µm, the polishing layer may have significant undulation so that it may have portions capable of being different in the state of contact with the material to be polished, which has an adverse effect on the polishing performance. In order to remove a skin layer from the surface of the polishing layer, buffing and/or slicing may be performed.

A polishing layer is preferably provided with a depression and a protrusion structure for holding and renewing a slurry. Though in a case where the polishing layer is formed with a fine foam, many openings are on a polishing surface thereof which works so as to hold the slurry, a depression and protrusion structure are preferably provided on the surface of the polishing side thereof in order to achieve more of holdability and renewal of the slurry or in order to prevent induction of dechuck error, breakage of a wafer or decrease in polishing efficiency. The shape of the depression and protrusion structure is not particularly limited insofar as slurry can be retained and renewed, and examples include X (stripe) grooves, latticed grooves, concentric circle-shaped grooves, through-holes, non-through-holes, polygonal prism, cylinder, spiral grooves, eccentric grooves, radial grooves, and a combination of these grooves. The groove pitch, groove width, groove thickness etc. are not particularly limited either, and are suitably determined to form grooves. These depression and protrusion structure are generally those having regularity, but the groove pitch, groove width, groove depth etc. can also be changed at each certain region to make retention and renewal of slurry desirable.

The method of forming the depression and protrusion structure is not particularly limited, and for example, formation by mechanical cutting with a jig such as a bite of predetermined size, formation by pressing resin with a pressing plate having a specific surface shape, formation by photolithography, formation by a printing means, and formation by a laser light using a $CO_2$ gas laser or the like.

The polishing pad of the invention may be that having a cushion sheet attached to one side of the polishing layer.

The cushion sheet (cushion layer) compensates for characteristics of the polishing layer. The cushion layer is required for satisfying both planarity and uniformity which are in a tradeoff relationship in CMP. Planarity refers to flatness of a pattern region upon polishing an object of polishing having fine unevenness generated upon pattern formation, and uniformity refers to the uniformity of the whole of an object of polishing. Planarity is improved by the characteristics of the polishing layer, while uniformity is improved by the characteristics of the cushion layer. The cushion layer used in the polishing pad of the present invention is preferably softer than the polishing layer.

The material forming the cushion layer is not particularly limited, and examples of such material include a nonwoven fabric such as a polyester nonwoven fabric, a nylon nonwoven fabric or an acrylic nonwoven fabric, a nonwoven fabric impregnated with resin such as a polyester nonwoven fabric impregnated with polyurethane, polymer resin foam such as polyurethane foam and polyethylene foam, rubber resin such as butadiene rubber and isoprene rubber, and photosensitive resin.

Means for adhering the cushion layer include: for example, a method in which a double sided tape is sandwiched between the polishing layer and the cushion layer, followed by pressing.

The double sided tape is of a common construction in which adhesive layers are provided on both surfaces of a substrate such as a nonwoven fabric or a film. It is preferable to use a film as a substrate with consideration given to prevention of permeation of a slurry into a cushion sheet. A composition of an adhesive layer is, for example, of a rubber-based adhesive, an acrylic-based adhesive or the like. An acrylic-based adhesive is preferable because of less of a content of metal ions, to which consideration is given. Since a polishing layer and a cushion sheet is sometimes different in composition from each other, different compositions are adopted in respective adhesive layers of double sided tape to thereby also enable adhesive forces of the respective adhesive layers to be adjusted to proper values.

A polishing pad of the invention may be provided with a double sided tape on the surface of the pad adhered to a platen. As the double sided tape, a tape of a common construction can be used in which adhesive layers are, as described above, provided on both surfaces of a substrate. As the substrate, for example, a nonwoven fabric or a film is used. Preferably used is a film as a substrate since separation from the platen is necessary after the use of a polishing pad. As a composition of an adhesive layer, for example, a rubber-based adhesive or an acrylic-based adhesive is exemplified. Preferable is an acrylic-based adhesive because of less of metal ions in content to which consideration is given.

A semiconductor device is fabricated after operation in a step of polishing a surface of a semiconductor wafer with a polishing pad. The term, a semiconductor wafer, generally means a silicon wafer on which a wiring metal and an oxide layer are stacked. No specific limitation is imposed on a polishing method of a semiconductor wafer or a polishing apparatus, and polishing is performed with a polishing apparatus equipped, as shown in FIG. 1, with a polishing platen 2 supporting a polishing pad (a polishing layer) 1, a polishing head 5 holding a semiconductor wafer 4, a backing material for applying a uniform pressure against the wafer and a supply mechanism of a polishing agent 3. The polishing pad 1 is mounted on the polishing platen 2 by adhering the pad to the platen with a double sided tape. The polishing platen 2 and the polishing head 5 are disposed so that the polishing pad 1 and the semiconductor wafer 4 supported or held by them oppositely face each other and provided with respective rotary shafts 6 and 7. A pressure mechanism for pressing the semiconductor wafer 4 to the polishing pad 1 is installed on the polishing head 5 side. During polishing, the semiconductor wafer 4 is polished by being pressed against the polishing pad 1 while the polishing platen 2 and the polishing head 5 are rotated and a slurry is fed. No specific limitation is placed on a flow rate of the slurry, a polishing load, a polishing platen rotation number and a wafer rotation number, which are properly adjusted.

Protrusions on the surface of the semiconductor wafer 4 are thereby removed and polished flatly. Thereafter, a semiconductor device is produced therefrom through dicing, bonding, packaging etc. The semiconductor device is used in an arithmetic processor, a memory etc.

EXAMPLES

Description will be given of the invention with examples, while the invention is not limited to description in the examples.

[Measurement and Evaluation Method]

(Measurement of Average Cell Diameter, Evaluation of Cell Shape)

A manufactured polishing layer was sliced with a microtome cutter into measurement samples each with the thinnest possible thickness of 1 mm or less. A surface of a sample was photographed with a scanning electron microscope (manufactured by Hitachi Science System Co. with a model number of S-3500N) at a magnification of ×200. An effective circular diameter of each of all cells in an arbitrary area was measured with an image analyzing soft (manufactured by MITANI Corp. with a trade name WIN-ROOF) and an average cell diameter was calculated from the measured values. On the other hand, the cell shape was observed.

(Measurement of Specific Gravity)

Determined according to JIS Z8807-1976. A manufactured polishing layer cut out in the form of a strip of 4 cm×8.5 cm (thickness: arbitrary) was used as a sample for measurement of specific gravity and left for 16 hours in an environment of a temperature of 23±2° C. and a humidity of 50%±5%. Measurement was conducted by using a specific gravity hydrometer (manufactured by Sartorius Co., Ltd).

(Evaluation of Appearance)

The surface of the resulting polishing layer was visually observed.

(Measurement of Thickness Variation)

Figure 4:
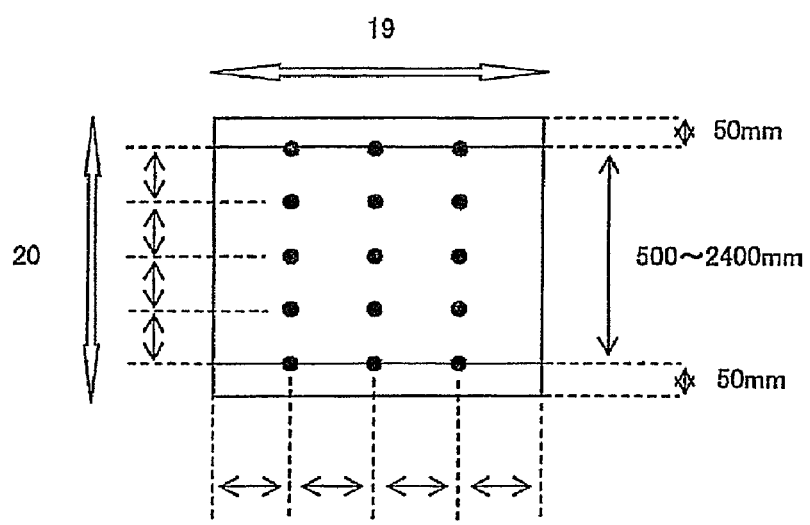
FIG. 4 is a schematic diagram showing 15 points at which thickness variation measurement is performed.

As shown in FIG. 4, both 50 mm transverse edge portions in the width direction were removed from the polyurethane foam after the post-curing, and then the thickness of the polyurethane foam was measured at each of the 15 points equally spaced in the length direction and in the width direction. The difference between the resulting maximum and minimum values of the thickness was defined as the thickness variation.

Preparation Example

A mixture of 32 parts by weight of toluene diisocyanate (a mixture of 2,4-toluene diisocyanate/2,6-toluene diisocyanate=80/20), 8 parts by weight of 4,4'-dicyclohexylmethane diisocyanate, 54 parts by weight of polytetramethylene glycol (1006 in number average molecular weight), and 6 parts by weight of diethylene glycol was prepared. The mixture was stirred and heated at 80° C. for 120 minutes so that an isocyanate-terminated prepolymer (2.1 meq/g in isocyanate equivalent) was prepared. One hundred parts by weight of the isocyanate-terminated prepolymer and 3 parts by weight of a silicone surfactant (SH-192 manufactured by Dow Corning Toray Silicone Co., Ltd.) were mixed to form a mixture, and the temperature of the mixture was controlled to be 60° C. In a mixing chamber, 80 parts by weight of the mixture and 20 parts by weigh of 4,4'-methylenebis(o-chloroaniline) (Iharacuamine MT manufactured by Ihara Chemical Industry Co., Ltd.) melted at 120° C. were mixed. At the same time, air was dispersed into the mixture by mechanical stirring so that a cell-dispersed urethane composition was prepared.

Example 1

While a release-treated face material A (188 μm thick, 100 cm wide) made of a PET film was thermally controlled at 50° C. by a heater and fed at a rate of 1 m/minute onto an immobile plate, the cell-dispersed urethane composition was continuously discharged from a discharge port of a mixing head to a central portion in the width direction of the face material A at a discharge rate of 1.2 L/minute and a discharge velocity of 9 m/minute (at a temperature of 62° C. during the discharge). While a release-treated face material B (188 μm thick, 100 cm wide) made of a PET film was thermally controlled at 50° C. by a heater and laminated over the composition at a feed rate of 1 m/minute, the thickness of the composition was uniformly adjusted using a doctor blade through a thickness adjusting section of 20 mm for a thickness adjusting time of 1.2 seconds. The composition was then cured by allowing it to pass through a heating oven placed at the immobile plate at 70° C. for 30 minutes so that a laminate containing a polishing sheet of a polyurethane foam was prepared. The resulting laminate was subjected to primary cutting so that an 80 cm square piece was obtained. Thereafter, the face materials A and B were released, and post-curing was performed at 80° C. for 6 hours. A skin layer was then removed from the surface of the polyurethane foam by buffing. The polyurethane foam was subjected to secondary cutting so that a polishing layer 70 cm in diameter (1.1 mm in thickness) was prepared.

Example 2

A polishing layer was prepared using the process of Example 1, except that face materials A and B each made of paper were used in place of the face materials A and B each made of a PET film.

Comparative Example 1

Figure 3:
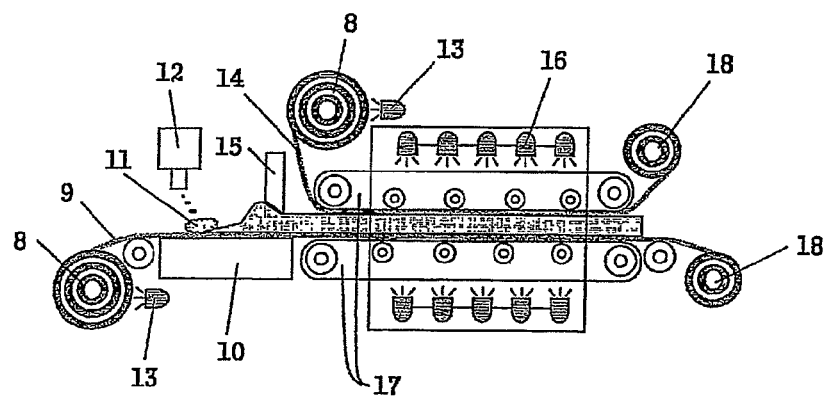
FIG. 3 is a schematic diagram showing the process for manufacturing a polishing sheet according to Comparative Example 1.

A polishing sheet was prepared by the method shown in FIG. 3. While a release-treated face material A 9 (188 μm thick, 100 cm wide) made of a PET film was thermally controlled at 50° C. by a heater 13 and fed at a rate of 4 m/minute onto an immobile plate 10, the cell-dispersed urethane composition 11 was continuously discharged from a discharge port of a mixing head 12 to a central portion in the width direction of the face material A at a discharge rate of 9.6 L/minute and a discharge velocity of 37.7 m/minute (at a temperature of 63° C. during the discharge). The thickness of the composition was then adjusted using a doctor blade 15 through a thickness adjusting section of 5 mm for a thickness adjusting time of 0.08 seconds. While a release-treated face material B 14 (188 μm thick, 100 cm wide) made of a PET film was thermally controlled at 50° C. by the heater 13 and laminated over the composition at a feed rate of 4 m/minute, the composition was cured by allowing it to pass through the space between double conveyors 17 equipped with a heating oven 16 at 70° C. for 7.5 minutes so that a laminate containing a polishing sheet of a polyurethane foam was prepared. The face materials A and B were released from the resulting laminate using take-up rolls 18. The polishing sheet was subjected to primary cutting so that an 80 cm square piece was obtained. The cut piece was then subjected to post-curing at 80° C. for 6 hours. A skin layer was then removed from the surface of the polyurethane foam by buffing. The polyurethane foam was subjected to secondary cutting so that a polishing layer 70 cm in diameter (1.1 mm in thickness) was prepared.

Comparative Example 2

A polishing layer was prepared using the process of Example 1, except that the face material B was not used.

TABLE 1

| | Average cell size (μm) | Cell shape | Specific gravity | Appearance | Thickness variation (μm) |
|---|---|---|---|---|---|
| Example 1 | 53 | Substantially spherical | 0.86 | Good | 39 |
| Example 2 | 52 | Substantially spherical | 0.85 | Good | 48 |
| Comparative Example 1 | — | Flat | 0.87 | Intrusion of voids | 132 |
| Comparative Example 2 | 51 | Substantially spherical | 0.89 | Intrusion of cured product | 51 |

It is apparent from Table 1 that polishing layers containing substantially spherical cells and having high thickness accuracy are obtained by the manufacturing method of the invention. In Comparative Example 1, the thickness was adjusted using a blade, before the face material B was laminated, so that a cured product adhered to the blade and that voids were formed on the surface of the polishing layer due to the influence of the cured product, which resulted in low thickness accuracy. In addition, flat cells were formed, because the composition was allowed to pass through the space between double conveyors after the thickness was adjusted with a blade. In Comparative Example 2, the thickness was adjusted using a blade without using the face material B, so that a cured product adhered to the blade and intruded into the surface of the polishing layer.

What is claimed is:

1. A method for manufacturing a polishing pad, comprising the steps or:
   preparing a cell-dispersed urethane composition by a mechanical foaming method;
   continuously discharging the cell-dispersed urethane composition from a single discharge port to a substantially central portion in a width direction of a face material A, while feeding the face material A;
   laminating a face material B on the cell-dispersed urethane composition;
   uniformly controlling a thickness of the cell-dispersed urethane composition by a thickness control means device;
   curing the cell-dispersed urethane composition with the controlled thickness without applying any additional load to the composition so that a polishing sheet comprising a polyurethane foam is formed; and
   cutting the polishing sheet,
   wherein the cell-dispersed urethane composition is discharged from the single discharge port at a temperature of 40 to 70° C., and the temperature of the face materials A and B is controlled to be in the range of ±20° C. of the temperature at which the cell-dispersed urethane composition is discharged.

2. The method of claim 1, wherein the face material A is fed at a rate of 0.5 to 2.5 m/min onto an immobile plate.

3. The method of claim 1, wherein the cell-dispersed urethane composition is discharged at a rate of 0.25 to 5 L/min, and the cell-dispersed urethane composition passing through the discharge port has a discharge velocity of 2 to 20 m/min.

4. A polishing pad produced by the method of claim 1.

5. A method for manufacturing a semiconductor device, comprising the step of polishing the surface of a semiconductor wafer with the polishing pad of claim 4.

* * * * *